(12) United States Patent
Broadley et al.

(10) Patent No.: US 8,746,640 B2
(45) Date of Patent: Jun. 10, 2014

(54) HANGER HOOK

(76) Inventors: Simon Broadley, West Linn, OR (US);
Brian VanderPloeg, Lake Oswego, OR (US)

(*) Notice: Subject to any disclaimer, the term of this patent is extended or adjusted under 35 U.S.C. 154(b) by 0 days.

(21) Appl. No.: 13/017,899

(22) Filed: Jan. 31, 2011

(65) Prior Publication Data

US 2011/0186702 A1 Aug. 4, 2011

Related U.S. Application Data

(60) Provisional application No. 61/300,006, filed on Jan. 31, 2010.

(51) Int. Cl.
*A47B 96/00* (2006.01)

(52) U.S. Cl.
USPC ............. 248/220.21; 248/694; 248/220.31; 248/914

(58) Field of Classification Search
USPC ......... 248/220, 691, 692, 914, 307, 341, 690, 248/303, 339, 224.8, 220.21, 220.31, 248/229.15, 694; 223/120, 94, 91, 85
See application file for complete search history.

(56) References Cited

U.S. PATENT DOCUMENTS

| | | | | |
|---|---|---|---|---|
| 252,441 | A * | 1/1882 | Edge | 63/10 |
| 253,737 | A * | 2/1882 | McDonald | 248/308 |
| 2,613,051 | A * | 10/1952 | Baum | 248/50 |
| 2,981,513 | A * | 4/1961 | Brown | 248/73 |
| 3,037,733 | A * | 6/1962 | Roman | 248/220.43 |
| 3,532,225 | A * | 10/1970 | Reed | 211/181.1 |
| D263,021 | S | 2/1982 | Siefried | |
| 4,953,817 | A * | 9/1990 | Mosteller | 248/222.51 |
| D380,665 | S | 7/1997 | Berg et al. | |
| D401,840 | S | 12/1998 | Goodman et al. | |
| D408,723 | S | 4/1999 | Goodman et al. | |
| 6,250,595 | B1 * | 6/2001 | Campbell | 248/211 |
| 6,364,266 | B1 * | 4/2002 | Garvin | 248/303 |
| D468,192 | S | 1/2003 | Lee | |
| D474,105 | S | 5/2003 | Lee | |
| 6,707,924 | B1 * | 3/2004 | Okiebisu | 381/385 |
| 7,025,309 | B2 * | 4/2006 | Goodwin et al. | 248/74.4 |
| D542,126 | S * | 5/2007 | Ernst et al. | D8/373 |
| 7,273,153 | B1 * | 9/2007 | Kuniyoshi | 211/85.7 |
| D565,934 | S * | 4/2008 | Volkwein | D8/356 |
| 7,427,053 | B2 * | 9/2008 | Nawrocki | 248/220.21 |
| D584,134 | S | 1/2009 | Lee | |
| 7,490,727 | B2 * | 2/2009 | Spiers et al. | 211/89.01 |
| D609,940 | S * | 2/2010 | Samu | D6/466 |
| 7,739,775 | B2 * | 6/2010 | Shimanski | 24/265 H |
| 7,922,140 | B2 * | 4/2011 | Carver | 248/339 |

(Continued)

*Primary Examiner* — Terrell McKinnon
*Assistant Examiner* — Monica Millner
(74) *Attorney, Agent, or Firm* — Keith J. Jenkins, Registered Patent Attorney, LLC; Keith L. Jenkins

(57) ABSTRACT

A hook having a fastener receiver with an axis of radial symmetry and two opposing edges defining a linear axis, where a support extends from the first edge and is angled away by a first angle from a midline plane defined by the linear axis and the axis of radial symmetry and a retainer extends from the second edge and is angled away from the midline plane by a second angle, preferably equal to the first angle and oppositely directed. The hanger hook is preferably of one piece construction but a two-piece interlocking version may also be made. Direct access to the fastener receiver is provided for tools and fasteners. The hanger hook retains equipment against 9 G horizontal accelerations and 3 G vertical accelerations.

19 Claims, 9 Drawing Sheets

(56) References Cited

U.S. PATENT DOCUMENTS

| | | | |
|---|---|---|---|
| 8,162,276 B2* | 4/2012 | Fathi et al. | 248/305 |
| 8,534,626 B1* | 9/2013 | Freese | 248/305 |
| 2002/0151930 A1* | 10/2002 | Mills | 606/204 |
| 2006/0022105 A1* | 2/2006 | MacKay | 248/304 |
| 2006/0160042 A1* | 7/2006 | Kretschmer et al. | 431/343 |
| 2006/0202102 A1* | 9/2006 | Nieciecki | 248/692 |
| 2007/0252061 A1* | 11/2007 | Feetham et al. | 248/302 |
| 2009/0013504 A1* | 1/2009 | Crespo | 24/306 |
| 2009/0108035 A1* | 4/2009 | Obenauf | 223/1 |
| 2009/0294491 A1* | 12/2009 | Carver | 223/85 |

* cited by examiner

ALL PRIOR ART THIS SHEET

HANGER HOOK

RELATED APPLICATIONS

This application claims the benefit of U.S. Provisional Patent Application 61/300,006 filed Jan. 31, 2010 for the same inventor.

FIELD OF THE INVENTION

This invention relates to a hanger hook for holding radio headsets in emergency vehicles. The invention further relates to a hanger hook adapted for retaining various types of strap, line, cable, cord, conduit, or filament in diverse applications.

BACKGROUND

New requirements mandate securing equipment in case of an accident in Emergency Vehicles like Fire Trucks and Ambulances: NFPA 1901-2009 states:
"14.1.11.2 All equipment not required to be used during an emergency response, with the exception of SCBA units, shall not be mounted in a driving or crew area unless it is contained in a fully enclosed and latched compartment capable of containing the contents when a 9 G force is applied in the longitudinal axis of the vehicle or a 3 G force is applied in any other direction, or the equipment is mounted in a bracket(s) that can contain the equipment when the equipment is subjected to those same forces."

Currently available simple hanger hooks are used to hold equipment but do not secure the equipment against a vertical 3 G force or horizontal 9 G force. Latching mechanisms and compartments increase the time it takes for emergency crew members to access their radio headsets, and so are not preferred.

U.S. Pat. No. D468,192 shows a single hook member that bends to the left as it curves back to the stem, without any retainer or collinear annular fastener opening. U.S. Pat. No. D474,105 also shows a single hook member that bends to the left as it curves back to the stem, without any retainer or collinear annular fastener opening. U.S. Pat. No. D282,904 shows a flat simple hook with a safety latch. U.S. Pat. No. D380,665 shows a safety hook that multiply bent. U.S. Pat. No. D401,840 shows a double hook having a top hook that is not a retainer above a collinear fastener opening and a bottom hook below the collinear fastener opening that partially obstructs frontal access to the fastener opening. U.S. Pat. No. D408,723 shows a single hook with collinear fastener openings with frontal access to the fastener opening partially obstructed by the hook end. U.S. Pat. No. D584,134 shows a hook rotated ninety degrees from a plane of an annular fastener opening.

Therefore, a need exists for a hanger hook that can retain equipment against a vertical 3 G force and a horizontal 9 G force. A need also exists for a hanger hook that enables rapid access to the retained emergency equipment. A need exists for a hanger hook that is easy to install. A need exists for a hanger hook that can be manufactured in various sizes and strengths for retaining equipments of various masses. A need exists for a hanger hook design that can be adapted to retaining various types of strap, line, cable, cord, conduit, or filament in widely diverse applications.

OBJECTS AND FEATURES OF THE INVENTION

A primary object and feature of the present invention is to overcome the above-mentioned problems and fulfill the above-mentioned needs.

Another object and feature of the present invention is to provide a hanger hook that can retain equipment against a vertical 3 G force and a horizontal 9 G force. Another object and feature of the present invention is to provide a hanger hook that enables rapid access to the retained emergency equipment. Another object and feature of the present invention is to provide a hanger hook that is easy to install. Another object and feature of the present invention is to provide a hanger hook that can be manufactured in various sizes and strengths for retaining equipments of various masses. Another object and feature of the present invention is to provide a hanger hook design that can be adapted to retaining various types of strap, line, cable, cord, conduit, or filament in diverse applications.

It is an additional primary object and feature of the present invention to provide a hanger hook that is safe, inexpensive, easy to clean, and handy. Other objects and features of this invention will become apparent with reference to the following descriptions.

The present invention was first shown at the Fire Rescue East exhibition in Daytona, Fla. on Jan. 22, 2010 and met with immediate and unexpected levels of commercial success.

SUMMARY OF THE INVENTION

In accordance with a preferred embodiment hereof, the present invention provides a hanger hook with upper and lower members (retainer and support, respectively) integral with an fastener receiver portion. The fastener receiver portion is annular, with the central opening sized to receive a fastener, such as a bolt. The thickness and the radial extent of the annular fastener receiver portion are dimensioned to be sufficient to endure a 9G force for the particular maximum mass to be retained, given the material used for the hanger hook. In preferred installed operation, the annular fastener receiver portion is secured to an interior surface or member of an emergency vehicle with a fastener through the central opening of the annular fastener receiver portion. The lower member extends from the bottom of the annular fastener receiver portion downward (in the drawings and in some installed operations) outward (relative to the surface of installation), and to the viewer's left via a first elbow portion, diagonally upward, outward, and to the viewer's left via a first straight portion, upward and inward by a second elbow portion, and upward, inward, and to the right by a second straight portion to a tip, thereby forming a support. The upper member extends from the top of the annular fastener receiver portion via a third elbow outward, downward, and to the right, and then by a third straight portion outward, downward, and to the right to a tip to form a retainer. The tip of the retainer is lower than the tip of the support. The tip of the support is preferably higher than the annular fastener receiver portion. The support is angled to the left and the retainer is angled to the right to provide clear access to the opening of the annular fastener receiver portion, thus assisting installation. In a particular embodiment, the directions may be reversed.

The hanger hook may be made of various materials. For emergency equipment retention, rigid metals, such as steel, are preferred. In other applications, such as retaining telephone wires or computer cables in an office, a rigid plastic may be preferred. Those of skill in the art, enlightened by the present disclosure, will appreciate the diverse applications to which the present invention may be applied and the requirements for the strength of materials for each particular application. In a particular application, the materials may be substantially resilient. In a particular embodiment, the hanger hook may be made in two parts, including a top member with a first annular fastener receiver portion and a lower member with a second annular fastener receiver portion, where first and second annular fastener receiver portions overlay and interlock in alignment and the hanger hook is assembled during installation.

Variation of shape of the external perimeter of the annular fastener receiver portion and of the cross-sectional shapes of the straight portions and elbows is within the scope of the invention.

A hanger hook including: an annular fastener receiver having first and second opposed outer edges, an axis of radial symmetry, and a linear axis; a retainer extending from the first edge of the annular fastener receiver and bending in a first direction and angled away from a midline plane, defined by the axis of radial symmetry and the linear axis; and a support extending from the second edge of the annular fastener receiver and bending in a second direction and angled away from the midline plane. The hanger hook, where the support includes: a first extension portion extending radially outward from the first edge and aligned to the linear axis; a first elbow portion extending arcuately from the first extension back toward the annular fastener receiver and angled away from the midline plane by a first angle; a first linear portion extending linearly from the first elbow portion; a second elbow portion extending arcuately from the first linear portion in a support plane with the first linear portion; and a second linear portion extending linearly from the second elbow. The hanger hook, further including a tip on the second linear portion having at least one of: a bevel; and a coating. The hanger hook, where the first angle is 17.5 degrees. The hanger hook, where the fastener receiver includes: a first fastener receiver portion having the first edge and the retainer; a second fastener receiver portion having the second edge and the support; where the first and second fastener receiver portions are configured to interlock to form the fastener hook. The hanger hook, where the retainer includes: a second extension portion extending radially outward from the second edge and aligned to the linear axis; a third elbow portion extending arcuately from the second extension back toward the annular fastener receiver and angled away from the midline plane by a second angle; and a third linear portion extending linearly from the third elbow portion. The hanger hook, further including a tip on the third linear portion having at least one of: a bevel; and a coating. The hanger hook, where the second angle is −17.5 degrees. The hanger hook, further including a fastener and a vehicle, where the fastener is operable to fasten the hanger hook to the vehicle. The hanger hook, further including a manufactured surface and the hanger hook attached to the manufactured surface. The hanger hook, where: the support has a first component of its extent parallel to the linear axis; the retainer has a second component of its extent parallel to the linear axis; and the first and second components overlap.

A hanger hook including: an annular fastener receiver having first and second opposed outer edges, an axis of radial symmetry, and a linear axis; a retainer extending from the first edge of the annular fastener receiver bending in a first direction and angled away from a midline plane defined by the axis of radial symmetry and the linear axis; a support extending from the second edge of the annular fastener receiver and bending in a second direction and angled away from the midline plane defined by the axis of radial symmetry and the linear axis; and where: the support has a component of its extent parallel to the linear axis; the retainer has a component of its extent parallel to the linear axis; and the components overlap. The hanger hook, where the support includes: a first extension portion extending radially outward from the first edge and aligned to the linear axis; a first elbow portion extending arcuately from the first extension back toward the annular fastener receiver and angled away from the midline plane by a first angle; a first linear portion extending linearly from the first elbow portion; a second elbow portion extending arcuately from the first linear portion in a support plane with the first linear portion; and a second linear portion extending linearly from the second elbow. The hanger hook, where the retainer includes: a second extension portion extending radially outward from the second edge and aligned to the linear axis; a third elbow portion extending arcuately from the second extension back toward the annular fastener receiver and angled away from the midline plane by a second angle; and a third linear portion extending linearly from the third elbow portion. The hanger hook, where the first and second angles are equal in magnitude and opposite in direction. The hanger hook, where the first and second angles have a magnitude of 17.5 degrees. The hanger hook, further including a fastener and a vehicle, where the fastener is operable to fasten the hanger hook to the vehicle. The hanger hook, further including a manufactured surface and the hanger hook attached to the manufactured surface.

A hanger hook including: an annular fastener receiver having first and second opposed outer edges, an axis of radial symmetry, a central opening, and a linear axis defined by the first and second outer edges and a center of the annular fastener receiver; a retainer extending from the first edge of the annular fastener receiver and bending in a first direction and angled away from a midline plane, where the midline plane is defined by the axis of radial symmetry and the linear axis; where the retainer includes: a second extension portion extending radially outward from the second edge and aligned to the linear axis; a third elbow portion extending arcuately from the second extension back toward the annular fastener receiver and angled away from the midline plane by a second angle; and a third linear portion extending linearly from the third elbow portion; a support extending from the second edge of the annular fastener receiver and bending in a second direction and angled away from the midline plane; where the support includes: a first extension portion extending radially outward from the first edge and aligned to the linear axis; a first elbow portion extending arcuately from the first extension back toward the annular fastener receiver and angled away from the linear axis by a first angle; a first linear portion extending linearly from the first elbow portion; a second elbow portion extending arcuately from the first linear portion in a support plane with the first linear portion; and a second linear portion extending linearly from the second elbow; a first tip on the second linear portion and a second tip on the third linear portion, where at least one of the first tip and the second tip comprise at least one of: a bevel; and a coating. where: the support has a first component of its extent parallel to the linear axis; the retainer has a second component of its extent parallel to the linear axis; and the first and second components overlap; where the first and second angles are equal in magnitude and opposite in direction; and where the annular fastener receiver, the support, and the retainer are made as a single piece. The hanger hook, further including a fastener and a vehicle, where the fastener is operable to fasten the hanger hook to the vehicle.

BRIEF DESCRIPTION OF THE DRAWINGS

The above and other objects and advantages of the present invention will become more apparent from the following description taken in conjunction with the following drawings in which.

DETAILED DESCRIPTION OF THE BEST MODES AND PREFERRED EMBODIMENTS OF THE INVENTION

Figure 1:
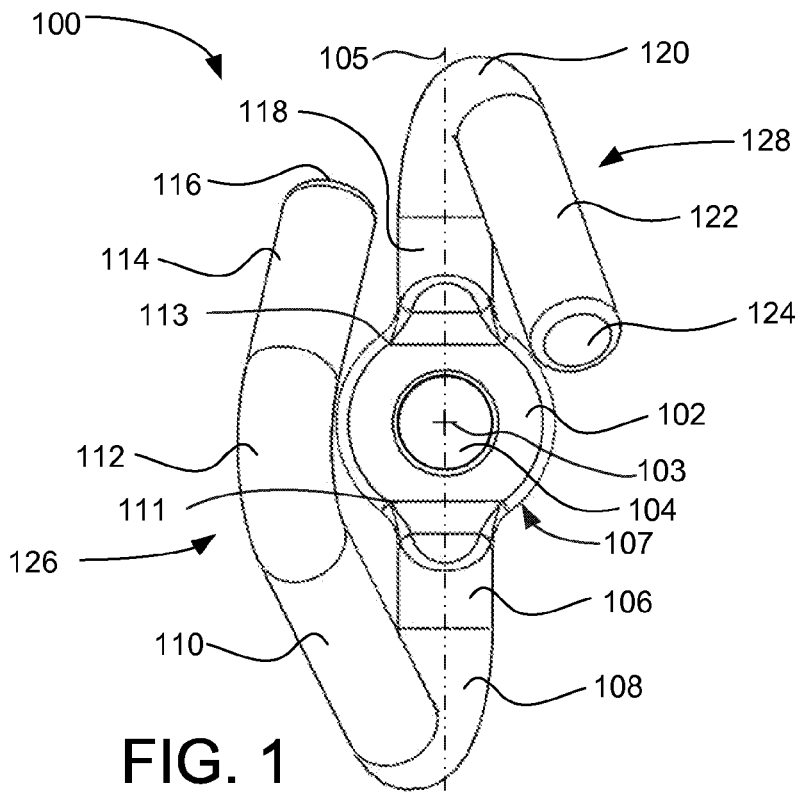
FIG. 1 is a front elevation view illustrating an exemplary hanger hook, according to a preferred embodiment of the present invention.

FIG. 1 is a front elevation view illustrating an exemplary hanger hook 100, according to a preferred embodiment of the present invention. The present invention provides a hanger hook 100 with upper and lower members 128, 126 integral with an annular fastener receiver portion 102. The fastener receiver portion 102 is annular, with the central opening 104 sized to receive a fastener, such as a bolt 2104 (see FIG. 22). The thickness and the radial extent of the annular fastener receiver portion 102 are dimensioned to be sufficient to endure a 9 G force for the particular maximum mass to be retained, given the material used for the hanger hook 100. In installed operation, the annular fastener receiver portion 102 is secured to an interior surface 2102 or member of a vehicle, such as an emergency vehicle, with a fastener 2108 through the central opening 104.

The following description refers to directions based on vertical installation on a vertical surface. It should be understood the hanger hook 100 is not limited to vertical installation nor to installation on a vertical surface. Hanger hook has an axis of radial symmetry 103 (out of the page, in this view) and a linear axis 105 that aligns with the center of central opening 104 and the two opposing edges 111 and 113 from which the retainer 128 and the support 126 extend. The lower member 126, or support 126, extends from the bottom edge 111 as extension 106 of the annular fastener receiver portion 102 downward (in the drawings and in some installed operations) outward (relative to the surface of installation 2102), and to the left (as viewed) via a first elbow portion 108; diagonally upward, outward, and to the left via a first straight, or linear, portion 110; upward and inward by a second elbow portion 112; and upward, inward, and to the right by a second linear portion 114 to a first tip 116, thereby forming a support 126. The upper member 128, or retainer 128, extends from the top edge 113 as extension 118 of the annular fastener receiver portion 102; via a third elbow 120 outward, downward, and to the right; and then by a third linear portion 122 outward, downward, and to the right to a second tip 124 to form a retainer 128. The second tip 124 of the retainer 128 is lower than the first tip 116 of the support 126. The components of the vertical (in this view) extents of the retainer 128 and the support 126 that are parallel to the linear axis overlap. Both the retainer 128 and the support 126 are angled away from a plane defined by said axis of radial symmetry 103 and the linear axis 105 by angles of equal magnitude and opposite direction, as will be further discussed below in regard to FIG. 5. The support 126 is angled to the left and the retainer 128 is angled to the right to provide clear access to the opening 104 of the annular fastener receiver portion 102 along the radial axis 103, thus assisting installation. In a particular embodiment, the directions may be reversed: the present invention includes the mirror image of hanger hook 100. The first tip 116 of the support 126 preferably extends beyond the top edge 113 of the annular fastener receiver portion 102, as shown. The second tip 124 of the retainer 128 preferably extends beyond the top edge 113 of the annular fastener receiver portion 102, as shown.

The hanger hook 100 may be made of various materials. For emergency equipment retention, rigid metals, such as steel, are preferred. In other applications, such as retaining telephone wires or computer cables in an office, a rigid plastic may be preferred. Those of skill in the art, enlightened by the present disclosure, will appreciate the diverse applications to which the present invention may be applied and the requirements for the strength of materials for each particular application. In a particular application, the materials may be substantially resilient. In a particular embodiment, the hanger hook 100 may be made in two parts, including a top member 128 with a first annular fastener receiver portion 102 and a lower member 126 with a second annular fastener receiver portion 102, where first and second annular fastener receiver portions 102 overlay and interlock in alignment and the hanger hook 100 is assembled during installation.

Variation of shape of the external perimeter of the annular fastener receiver portion 102 and of the cross-sectional shape of the retainer 128 and the support 126 is within the scope of the invention. The angular extent to which the retainer 128 and support 126 diverge from the vertical (as illustrated) is variable over various embodiments, within the constraints that direct (axially aligned) frontal tool access (i.e., for a nut driver or screw driver) be provided to opening 104 and that the hanger hook 100 still retain the illustrated functionality of preventing a retained strap 1504 (see FIG. 15) from escaping under a 9 G load.

In an alternate embodiment for ceiling attachment, the annular fastener receiver portion 102 may be in the position of elbow 120.

Figure 2:
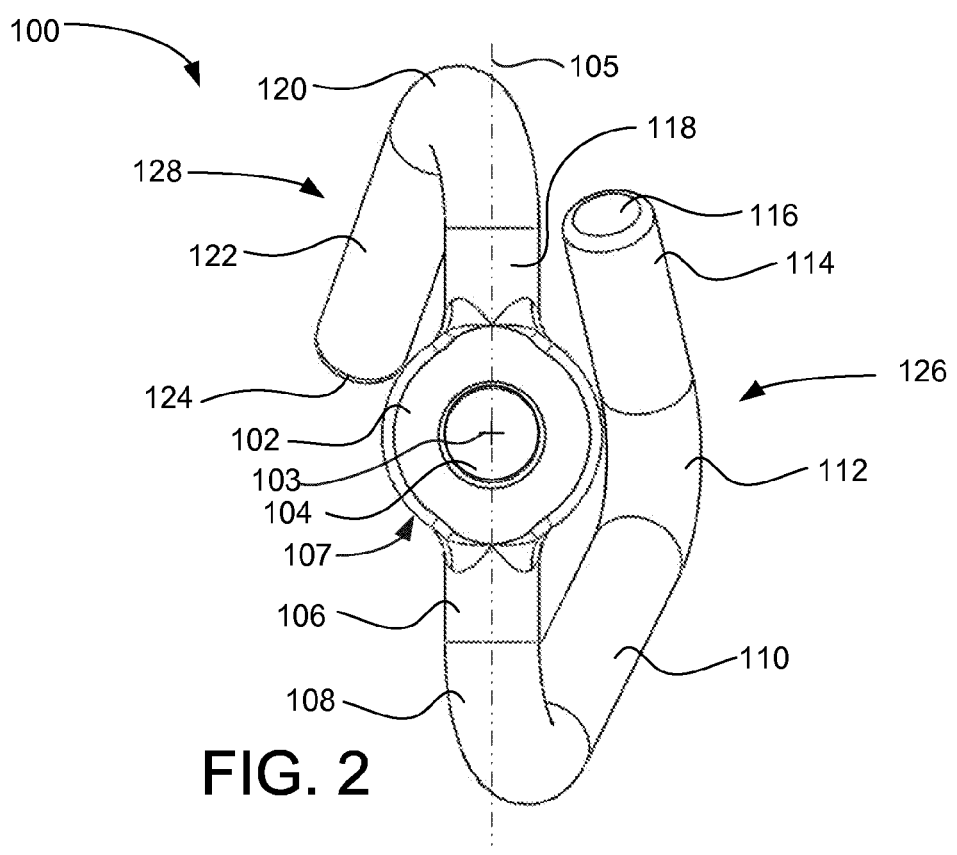
FIG. 2 is a rear elevation view illustrating an exemplary hanger hook, according to the preferred embodiment of FIG. 1.

FIG. 2 is a rear elevation view illustrating an exemplary hanger hook 100, according to the preferred embodiment of FIG. 1. In FIGS. 1-6, the lines separating the reference-numbered portions of support 126 and retainer 128 do not indicate discrete parts. The hanger hook 100 is preferably made of one piece.

Figure 3:
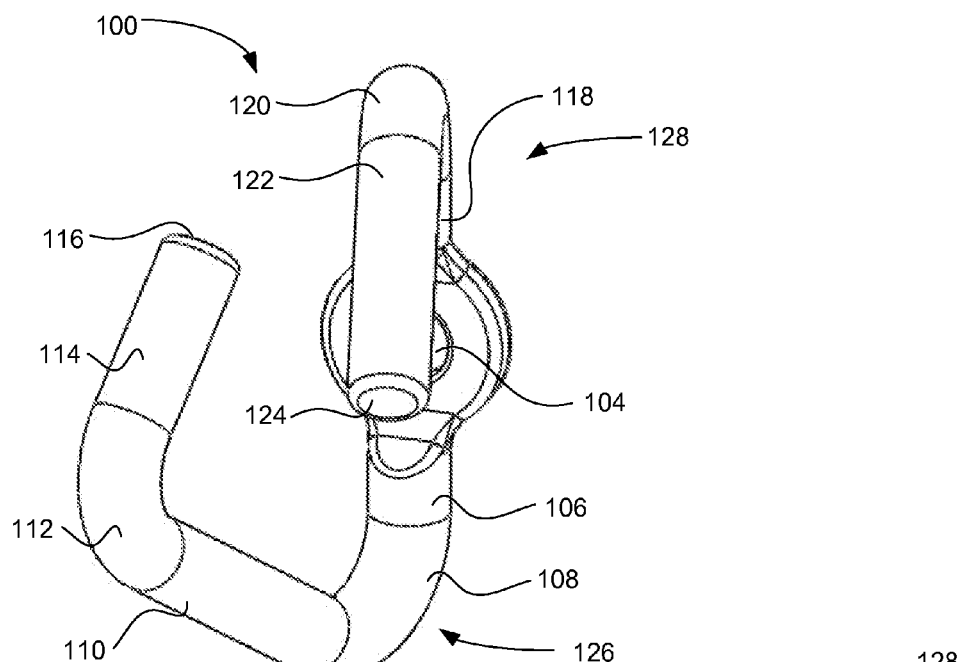
FIG. 3 is a front-top perspective view illustrating an exemplary hanger hook, according to the preferred embodiment of FIG. 1.

FIG. 3 is a front-top perspective view illustrating an exemplary hanger hook 100, according to the preferred embodiment of FIG. 1. The hanger hook 100 may be made in various sizes and materials. For example, a very small hanger hook 100 for retaining wires or strap cable in place inside a personal computer may be made of an electrically insulating material, such as plastic.

Figure 4:
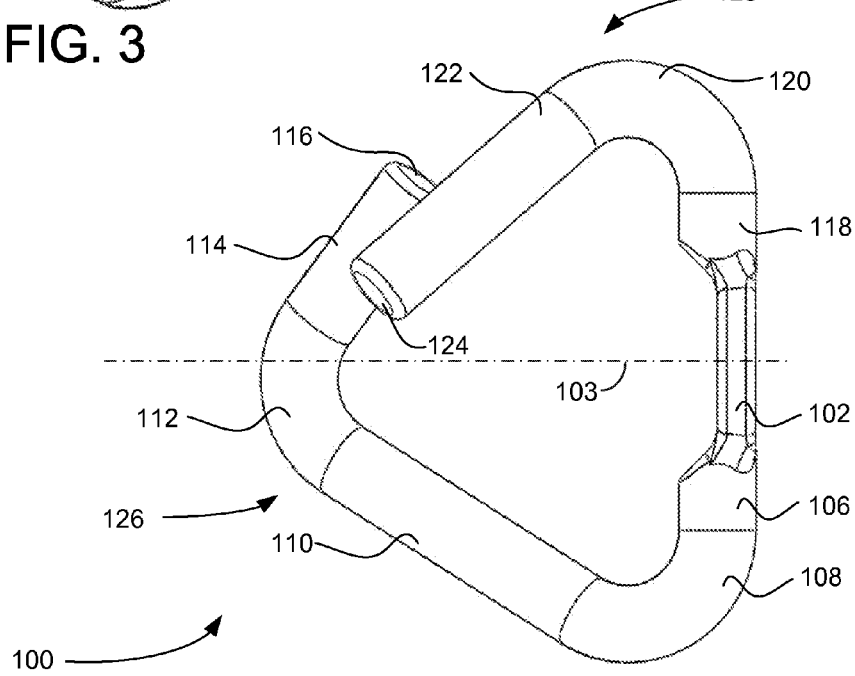
FIG. 4 is a left elevation view illustrating an exemplary hanger hook, according to the preferred embodiment of FIG. 1.

FIG. 4 is a left elevation view illustrating an exemplary hanger hook 100, according to the preferred embodiment of FIG. 1. Extensions 118 and 106 from annular fastener receiver portion 102 may be of various lengths, adapted to the requirements of the equipment to be retained. Annular fastener receiver portion 102 may be thicker or thinner than the illustrative example, depending on the mass of the equipment to be retained. When installed in an emergency vehicle, the axis of radial symmetry 103 of annular fastener receiver 102 is preferably perpendicular to the long axis of the vehicle and the divergence of the support 126 from such axis is preferably toward the rear of the vehicle. However, hanger hook 100 may be installed in various orientations.

Figure 5:
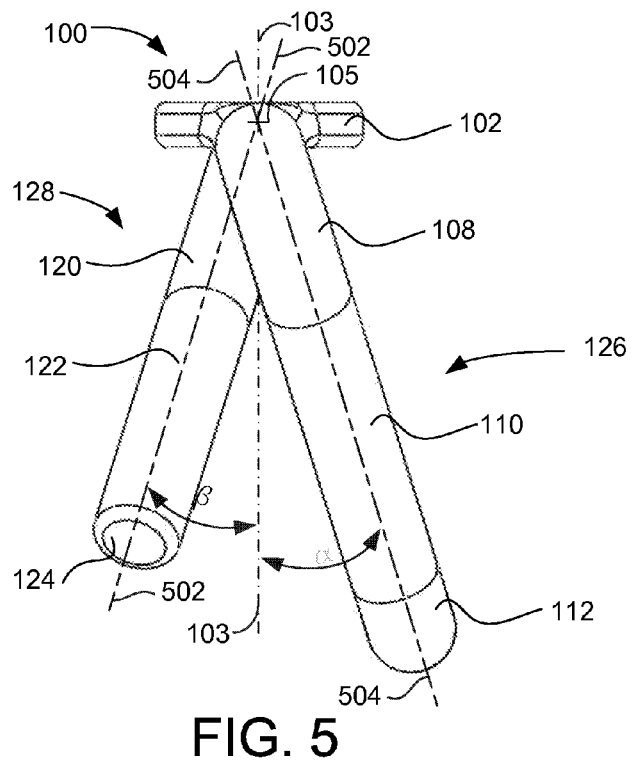
FIG. 5 is a bottom plan view illustrating an exemplary hanger hook, according to the preferred embodiment of FIG. 1.

FIG. 5 is a bottom plan view illustrating an exemplary hanger hook 100, according to the preferred embodiment of FIG. 1. In a particular embodiment, linear portions 122 and 110 may be curved, within the constraint that retainer tip 124 is lower than support tip 116 in an installed position (FIG. 1), and that the support 126 and the retainer 128 diverge to enable tool access to opening 104 for fastening the hanger hook 100 to an interior surface 2102 or structural member of a vehicle, or to other useful surface or structure 2102.

From FIG. 5, it can be seen that the elements of the retainer 128 lie in a retainer plane 502 and that the configuration of the elbow 120 is responsible for angling the retainer 128 away from the midline plane defined by linear axis 105 and the axis of radial symmetry 103. In FIG. 5, the axis of radial symmetry 103 is collinear with the edge of the midline plane. It can also be seen that the elements of the support 126 lie in a support plane 504 and that the configuration of the elbow 108 is responsible for angling the support 126 away from the midline plane.

The angle α outward from the midline plane made by the support 126 may be clearly seen in this view. The angle β outward from the midline plane to the retainer 128 may also be clearly seen in this view. Preferably α and β are of equal magnitude and of opposite direction. Most preferably, α and β are 17.5 degrees. In various alternate embodiments, the angles α and β may differ, within the boundaries of continuing to hold equipment against 9 G accelerations in the horizontal plane and 3 G accelerations in the vertical plane.

Figure 6:
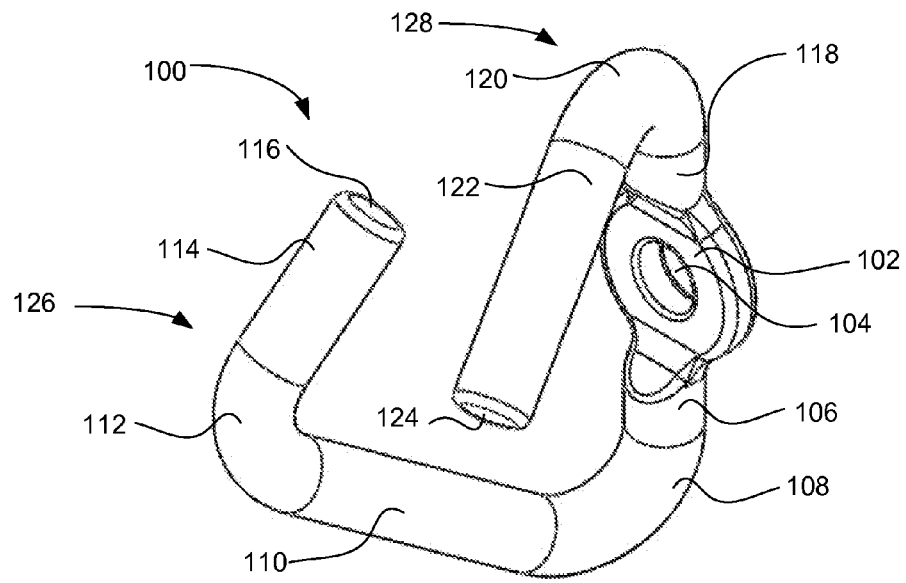
FIG. 6 is a front-top perspective view illustrating an exemplary hanger hook, according to the preferred embodiment of FIG. 1.

FIG. 6 is a front-top perspective view illustrating an exemplary hanger hook 100, according to the preferred embodiment of FIG. 1. In a particular alternate embodiment, hanger hook 100 may have a coating, such as, without limitation, an anodized coating, a polymeric coating, or a ceramic coating. In an appropriate alternate embodiment, first and second tips 116 and 124 may be padded. Preferably, first and second tips 116 and 124 are beveled, as shown.

In an alternate embodiment, annular fastener receiver portion 102 may replace elbow 120 and a linear portion may replace the original annular fastener receiver portion 102 for fastening the hanger hook to a ceiling. In another alternate embodiment, annular fastener receiver portion 102 may replace elbow 108 and a linear portion may replace the original annular fastener receiver portion 102 for fastening the hanger hook to a floor.

Figure 7:
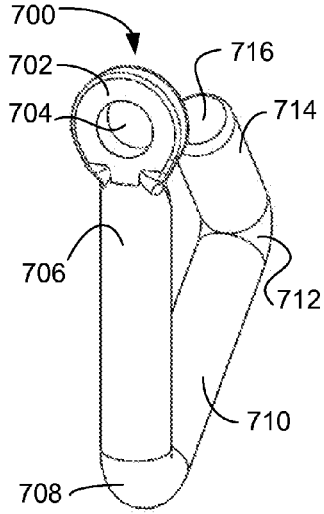
FIG. 7 is a rear-side perspective view illustrating an exemplary prior art hook.

FIG. 7 is a rear-side perspective view illustrating an exemplary prior art hook 700. Annular attachment portion 702 has central opening 704 to receive a fastener. First straight portion 706 extends downwardly from annular attachment portion 702 to first elbow 708, which curves directly outward from an attachment surface and upward. Second straight portion 710 extends upward and outward from first elbow 708 to second elbow 712, which curves upward and inward. Third straight portion 714 extends upward and inward to form exemplary prior art hook 700. Exemplary prior art hook 700 has no retainer 128, and so cannot retain equipment undergoing an upward 3 G force.

Safety hooks have a biased-closed hinged member (not shown) between the joint of annular attachment portion 702 and straight portion 706, which extends in the biased condition to straight portion 714. Safety hooks require two actions to allow retrieval of equipment: first to open the hinged member and second to retrieve the equipment. The retrieval of equipment from a safety hook often requires two hands, whereas equipment can be retrieved from the hanger hook 100 with one hand making a single twisting motion.

Figure 8:
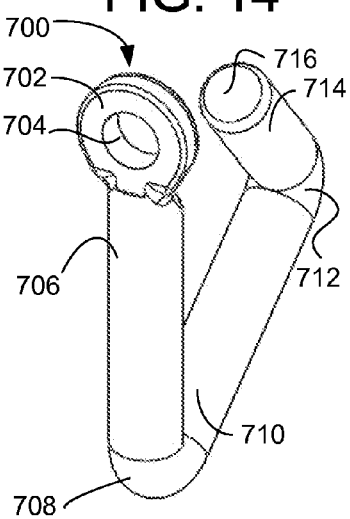
FIG. 8 is another rear-side perspective view illustrating the exemplary prior art hook of FIG. 7.

FIG. 8 is another rear-side perspective view illustrating the exemplary prior art hook 700 of FIG. 7.

Figure 9:
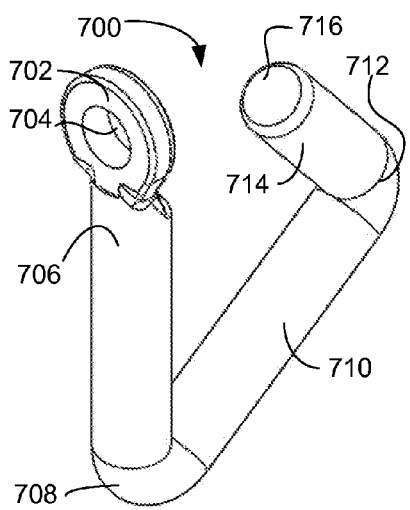
FIG. 9 is another rear-side perspective view illustrating the exemplary prior art hook of FIG. 7.

FIG. 9 is yet another rear-side perspective view illustrating the exemplary prior art hook 700 of FIG. 7.

Figure 10:
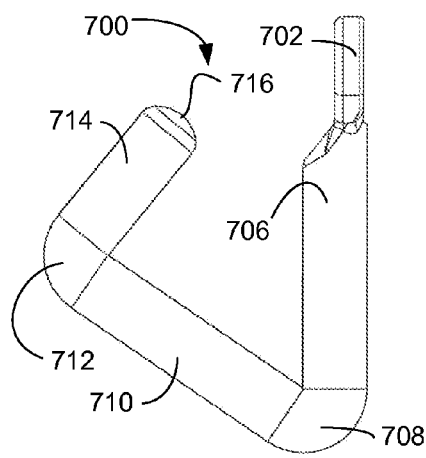
FIG. 10 is a left side elevation view illustrating the exemplary prior art hook of FIG. 7.

FIG. 10 is a left side elevation view illustrating the exemplary prior art hook 700 of FIG. 7. The vertical extent of straight portion 714 must be limited to avoid obstructing direct tool access to opening 704. Compare FIG. 4 with FIG. 10.

Figure 11:
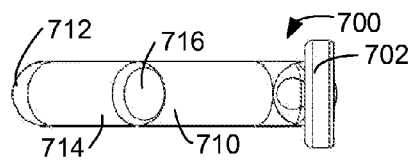
FIG. 11 is a top plan view illustrating the exemplary prior art hook of FIG. 7.

FIG. 11 is a top plan view illustrating the exemplary prior art hook 700 of FIG. 7. Exemplary prior art hook 700 extends perpendicularly from the vertical surface to which it is attached. Because of the lack of a retainer 128, the orientations in which exemplary prior art hook 700 will function properly are much more limited than hanger hook 100.

Figure 12:
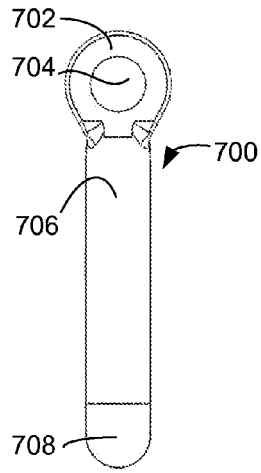
FIG. 12 is a rear elevation view illustrating the exemplary prior art hook of FIG. 7
Figure 13:
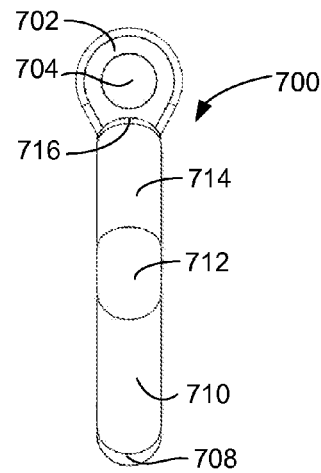
FIG. 13 is a front elevation view illustrating the exemplary prior art hook of FIG. 7.
Figure 14:
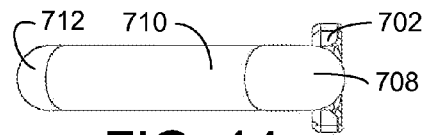
FIG. 14 is a bottom plan view illustrating the exemplary prior art hook of FIG. 7.

FIG. 12 is a rear elevation view illustrating the exemplary prior art hook 700 of FIG. 7. FIGS. 12, 13, and 14 are provided for completeness.

FIG. 13 is a front elevation view illustrating the exemplary prior art hook 700 of FIG. 7.

FIG. 14 is a bottom plan view illustrating the exemplary prior art hook 700 of FIG. 7.

Figure 15:
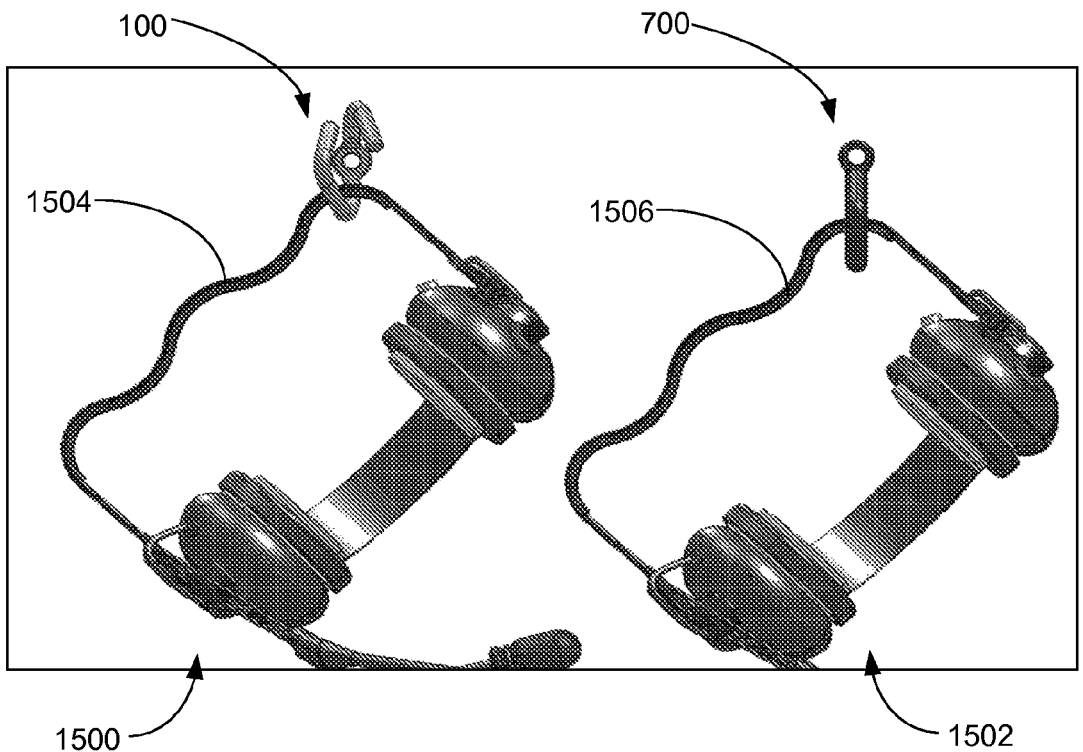
FIG. 15 includes front elevation views illustrating for comparison of the prior art hook of FIG. 7 and the exemplary hanger hook of FIG. 1.

FIG. 15 includes front elevation views illustrating, for comparison, the prior art hook 700 of FIG. 7 and the exemplary hanger hook 100 of FIG. 1. Strap 1504 of headset 1500 is captured by hanger hook 100, whereas strap 1506 of headset 1502 hangs on exemplary prior art hook 700, waiting to be dislodged by a 3 G force from a bump in the road.

Figure 16:
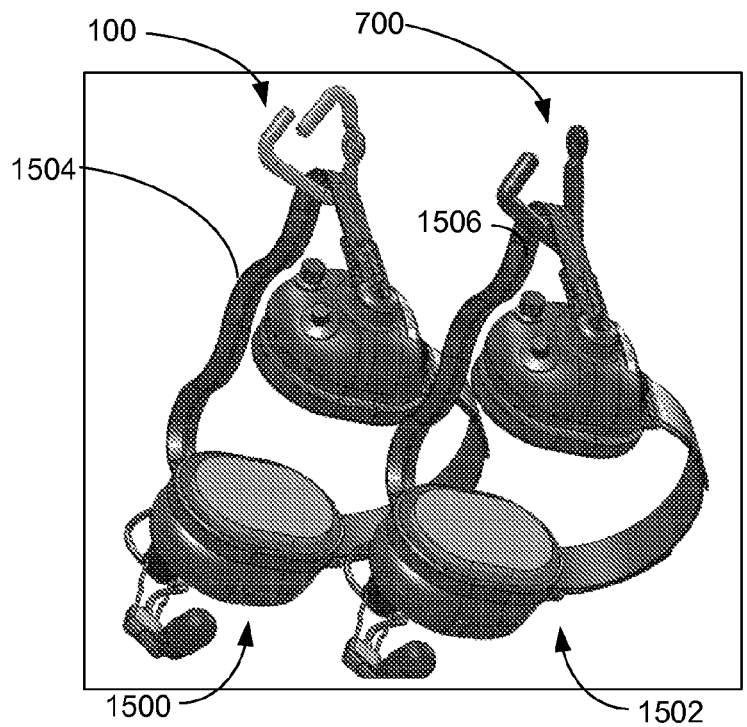
FIG. 16 includes front-side perspective views illustrating for comparison of the prior art hook of FIG. 7 and the exemplary hanger hook of FIG. 1.

FIG. 16 includes front-side perspective views illustrating, for comparison, the prior art hook 700 of FIG. 7 and the exemplary hanger hook 100 of FIG. 1. Strap 1504 of headset 1500 is captured by hanger hook 100, whereas strap 1506 of headset 1502 hangs on exemplary prior art hook 700, waiting to be dislodged by a 3 G force from a bump in the road.

Figure 17:
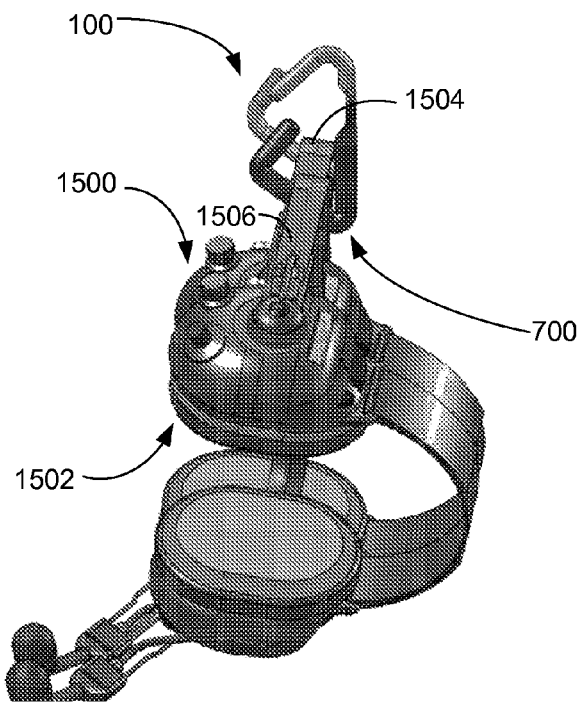
FIG. 17 includes right side elevation views illustrating for comparison of the prior art hook of FIG. 7 and the exemplary hanger hook of FIG. 1.

FIG. 17 includes right side elevation views illustrating, for comparison, the prior art hook 700 of FIG. 7 and the exemplary hanger hook 100 of FIG. 1. Strap 1504 of headset 1500 is captured by hanger hook 100, whereas strap 1506 of headset 1502 hangs on exemplary prior art hook 700, waiting to be dislodged by a 3 G force from a bump in the road. It can be appreciated from this view that the rotation of the hanger hook 100 about an axis normal to the drawing page would not dislodge the strap 1504. Accordingly, the hanger hook 100 is adaptable to be used on more surfaces within an emergency vehicle or in any other application.

Figure 18:
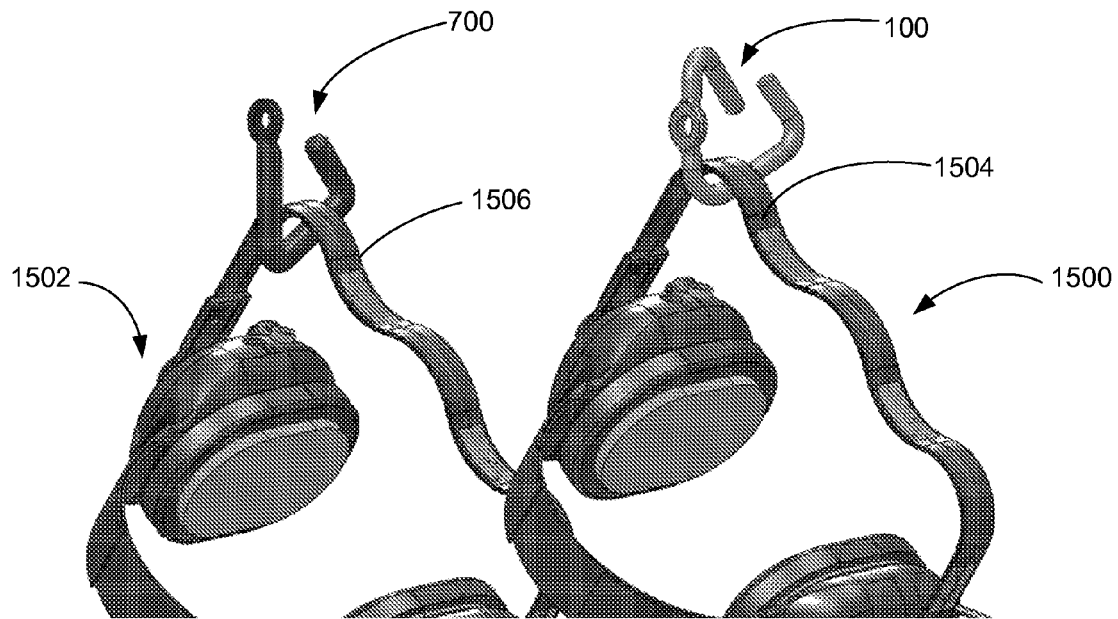
FIG. 18 includes rear-side perspective views illustrating for comparison of the prior art hook of FIG. 7 and the exemplary hanger hook of FIG. 1.

FIG. 18 includes rear-side perspective views illustrating for comparison of the prior art hook 700 of FIG. 7 and the exemplary hanger hook 100 of FIG. 1. Strap 1504 of headset 1500 is captured by hanger hook 100, whereas strap 1506 of headset 1502 hangs on exemplary prior art hook 700, waiting to be dislodged by a 3 G force from a bump in the road.

Figure 19:
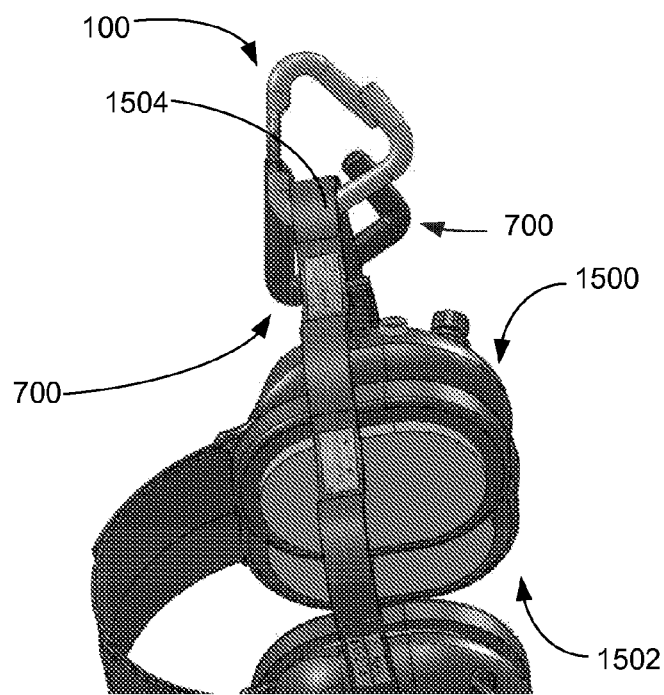
FIG. 19 includes left side elevation views illustrating for comparison of the prior art hook of FIG. 7 and the exemplary hanger hook of FIG. 1.

FIG. 19 includes left side elevation views illustrating for comparison of the prior art hook 700 of FIG. 7 and the exemplary hanger hook 100 of FIG. 1. Strap 1504 of headset 1500 is captured by hanger hook 100, whereas strap 1506 of headset 1502 hangs on exemplary prior art hook 700, waiting to be dislodged by a 3 G force from a bump in the road. It can be appreciated from this view that the rotation of the hanger hook 100 about an axis normal to the drawing page would not dislodge the strap 1504. Accordingly, the hanger hook 100 is adaptable to be used on more surface orientations within an emergency vehicle or in any other application.

Figure 20:
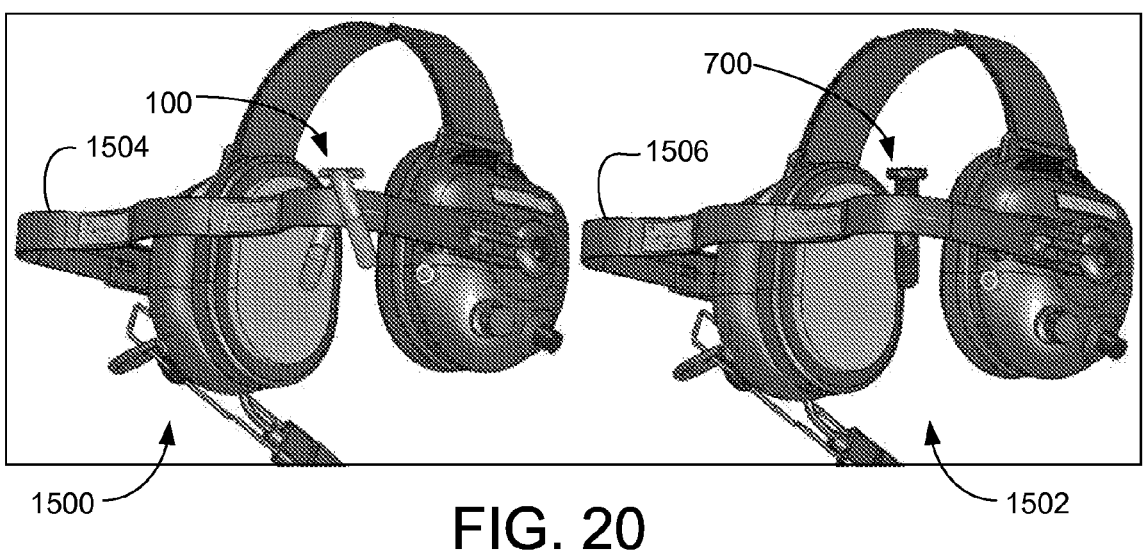
FIG. 20 includes top plan views illustrating for comparison of the prior art hook of FIG. 7 and the exemplary hanger hook of FIG. 1.

FIG. 20 includes top plan views illustrating for comparison of the prior art hook 700 of FIG. 7 and the exemplary hanger hook 100 of FIG. 1. This view shows most clearly that vertical motion of the headset 1500 would still result in retention of strap 1504 in hanger hook 100, while vertical motion of headset 1502 would result in strap 1506 not being retained in exemplary prior art hook 700.

Figure 21:
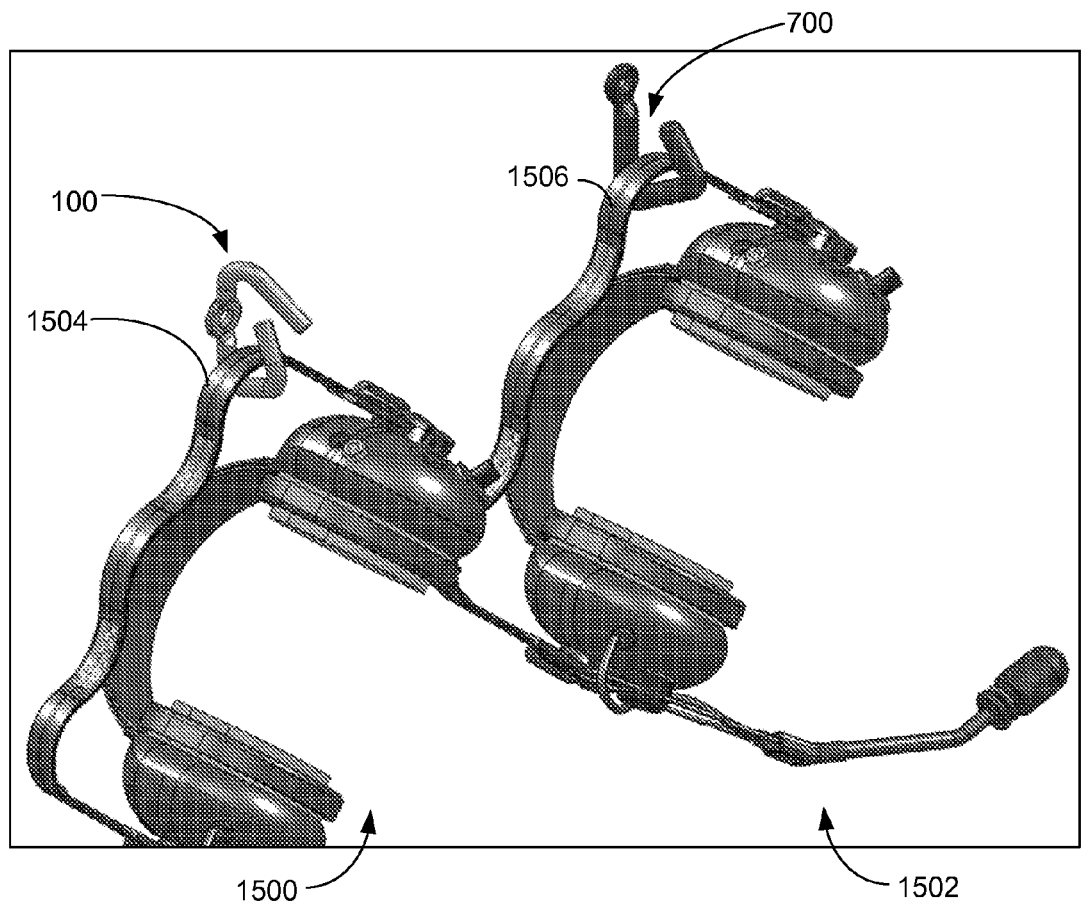
FIG. 21 includes side-front perspective views illustrating for comparison of the prior art hook of FIG. 7 and the exemplary hanger hook of FIG. 1.

FIG. 21 includes side-front perspective views illustrating for comparison of the prior art hook 700 of FIG. 7 and the exemplary hanger hook 100 of FIG. 1. This view illustrates that a single twisting motion will enable retrieval of headset 1500 from hanger hook 100.

Figure 22:
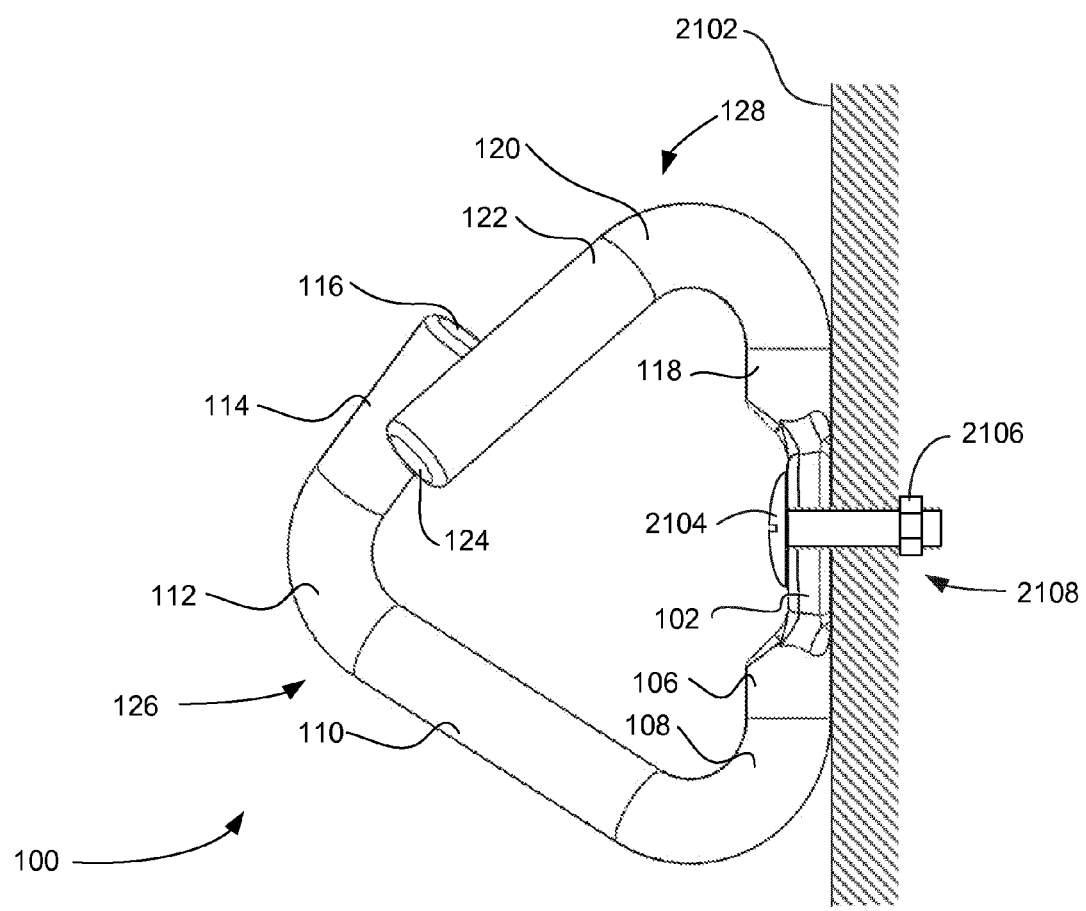
FIG. 22 is a side elevation view illustrating an exemplary hanger hook installed on a panel, according to the preferred embodiment of FIG. 1.

FIG. 22 is a side elevation view illustrating an exemplary hanger hook 100 installed on a panel 2102, according to the preferred embodiment of FIG. 1. Panel 2102 may be any manufactured surface, such as a structural member in an emergency vehicle or a panel in an electronics chassis. Exemplary fastener 2108 is illustrated as a bolt 2104 with a rounded and slotted head and a nut 2106. Bolt 2104 is inserted through central opening 104 and through a prepared bolt hole in the panel 2102 before receiving nut 2106. The exemplary fastener 2108 is not intended to be limiting, but any portion of the fastener 2108 that protrudes into the hanger hook, such as the round head of bolt 2104, should not catch on straps placed within the hanger hook 100. For example, a wing bolt is not recommended.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A hanger hook comprising:
   a. an annular fastener receiver having:
      i. a central circular opening and first and second opposed outer edges;
      ii. an axis of radial symmetry extending transversely through a plane in which said central circular opening lies and through a center of said central circular opening; and
      iii. a linear axis in said plane in which said central circular opening lies bisecting said first and second outer edges and transversely intersecting said axis of radial symmetry;
   b. a retainer extending from said first outer edge of said annular fastener receiver and bending in a first direction and angled away from a midline plane, wherein said midline plane is defined by said axis of radial symmetry and said linear axis; and
   c. a support extending from said second outer edge of said annular fastener receiver and bending in a second direction and angled away from said midline plane;
   d. wherein said retainer overarches said support to retain an object, that is initially supported on said support, against disturbances that cause such object to at least partially lose contact with said support;
   e. wherein said support comprises:
      i. a first extension portion extending radially outward from said first outer edge and aligned to said linear axis;
      ii. a first elbow portion extending arcuately from said first extension back toward said annular fastener receiver and angled away from said midline plane by a first angle; and
      iii. a first linear portion extending linearly from said first elbow portion;
      iv. a second elbow portion extending arcuately from said first linear portion in a support plane with said first linear portion; and
      v. a second linear portion extending linearly from said second elbow.

2. The hanger hook of claim 1, further comprising a tip on said second linear portion having at least one of:
   a. a bevel; and
   b. a coating.

3. The hanger hook of claim 1, wherein said first angle is 17.5 degrees.

4. The hanger hook of claim 1, wherein said fastener receiver comprises:
   a. a first fastener receiver portion having said first outer edge and said retainer;
   b. a second fastener receiver portion having said second outer edge and said support;
   c. wherein said first and second fastener receiver portions are configured to interlock to form said fastener hook.

5. The hanger hook of claim 1, wherein said retainer comprises:
   b. a second extension portion extending radially outward from said second outer edge and aligned to said linear axis;

c. a third elbow portion extending arcuately from said second extension back toward said annular fastener receiver and angled away from said midline plane by a second angle; and d. a third linear portion extending linearly from said third elbow portion.

6. The hanger hook of claim 5, further comprising a tip on said third linear portion having at least one of:
a. a bevel; and
b. a coating.

7. The hanger hook of claim 5, wherein said second angle is −17.5 degrees.

8. The hanger hook of claim 1, further comprising a fastener and a vehicle, wherein said fastener is operable to fasten said hanger hook to said vehicle.

9. The hanger hook of claim 1, further comprising a manufactured surface and said hanger hook attached with a fastener to said manufactured surface.

10. The hanger hook of claim 1, wherein:
a. said support has a first component of its extent parallel to said linear axis;
b. said retainer has a second component of its extent parallel to said linear axis; and
c. said first and second components overlap.

11. A hanger hook comprising:
a. an annular fastener receiver having;
  i. a central circular opening and first and second opposed outer edges:
  ii. an axis of radial symmetry extending transversely through a plane in which said central circular opening lies and through a center of said central circular opening; and
  iii. a linear axis in said plane in which said central circular opening lies bisecting said first and second outer edges and transversely intersecting said axis of radial symmetry;
b. a retainer extending from said first outer edge of said annular fastener receiver bending in a first direction and angled away from a midline plane, wherein said midline plane is defined by said axis of radial symmetry and said linear axis;
c. a support extending from said second outer edge of said annular fastener receiver and bending in a second direction and angled away from said midline plane defined by said axis of radial symmetry and said linear axis;
d. wherein:
  i. said support has a component of its extent parallel to said linear axis;
  ii. said retainer has a component of its extent parallel to said linear axis; and
  iii. said components overlap; and
e. wherein said retainer overarches said support to retain an object, that is initially supported on said support, against disturbances that cause such object to at least partially lose contact with said support.

12. The hanger hook of claim 11, wherein said support comprises:
a. a first extension portion extending radially outward from said first outer edge and aligned to said linear axis;
b. a first elbow portion extending arcuately from said first extension back toward said annular fastener receiver and angled away from said midline plane by a first angle;
c. a first linear portion extending linearly from said first elbow portion;
d. a second elbow portion extending arcuately from said first linear portion in a support plane with said first linear portion; and e. a second linear portion extending linearly from said second elbow.

13. The hanger hook of claim 12, wherein said retainer comprises:
a. a second extension portion extending radially outward from said second outer edge and aligned to said linear axis;
b. a third elbow portion extending arcuately from said second extension back toward said annular fastener receiver and angled away from said midline plane by a second angle; and
c. a third linear portion extending linearly from said third elbow portion.

14. The hanger hook of claim 13, wherein said first and second angles are equal in magnitude and opposite in direction.

15. The hanger hook of claim 14, wherein said first and second angles have a magnitude of 17.5 degrees.

16. The hanger hook of claim 11, further comprising a fastener and a vehicle, wherein said fastener is operable to fasten said hanger hook to said vehicle.

17. The hanger hook of claim 11, further comprising a manufactured surface and said hanger hook attached with a fastener to said manufactured surface.

18. A hanger hook comprising:
a. an annular fastener receiver having;
  i. a central circular opening and first and second opposed outer edges;
  ii. an axis of radial symmetry extending transversely through a plane in which said central circular opening lies and through a center of said central circular opening; and
  iii. a linear axis in said plane in which said central circular opening lies bisecting said first and second outer edges and transversely intersecting said axis of radial symmetry;
b. a retainer extending from said first outer edge of said annular fastener receiver and bending in a first direction and angled away from a midline plane, wherein said midline plane is defined by said axis of radial symmetry and said linear axis;
c. wherein said retainer comprises:
  i. a second extension portion extending radially outward from said second outer edge and aligned to said linear axis;
  ii. a third elbow portion extending arcuately from said second extension back toward said annular fastener receiver and angled away from said midline plane by a second angle; and
  iii. a third linear portion extending linearly from said third elbow portion;
d. a support extending from said second outer edge of said annular fastener receiver and bending in a second direction and angled away from said midline plane;
e. wherein said support comprises:
  i. a first extension portion extending radially outward from said first outer edge and aligned to said linear axis;
  ii. a first elbow portion extending arcuately from said first extension back toward said annular fastener receiver and angled away from said linear axis by a first angle;
  iii. a first linear portion extending linearly from said first elbow portion;
  iv. a second elbow portion extending arcuately from said first linear portion in a support plane with said first linear portion; and v. a second linear portion extending linearly from said second elbow;
f. a first tip on said second linear portion and a second tip on said third linear portion, wherein at least one of said first tip and said second tip comprise at least one of:
  i. a bevel; and
  ii. a coating.
g. wherein:
  i. said support has a first component of its extent parallel to said linear axis;
  ii. said retainer has a second component of its extent parallel to said linear axis; and
  iii. said first and second components overlap;
h. wherein said first and second angles are equal in magnitude and opposite in direction;
i. wherein said annular fastener receiver, said support, and said retainer are made as a single piece; and
j. wherein said retainer overarches said support to retain an object, that is initially supported on said support, against disturbances that cause such object to at least partially lose contact with said support.

19. The hanger hook of claim 18, further comprising a fastener and a vehicle, wherein said fastener is operable to fasten said hanger hook to said vehicle.

\* \* \* \* \*